(12) United States Patent
McCarty et al.

(10) Patent No.: US 7,007,036 B2
(45) Date of Patent: Feb. 28, 2006

(54) METHOD AND APPARATUS FOR EMBEDDING CONFIGURATION DATA

(75) Inventors: Christopher J. McCarty, Colorado Springs, CO (US); Stephen B. Johnson, Colorado Springs, CO (US); Brad D. Besmer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 422 days.

(21) Appl. No.: 10/109,285

(22) Filed: Mar. 28, 2002

(65) Prior Publication Data

US 2003/0187818 A1 Oct. 2, 2003

(51) Int. Cl.
*G06F 7/00* (2006.01)
(52) U.S. Cl. .............................. 707/102; 707/1; 711/114
(58) Field of Classification Search .............. 707/1–10, 707/102, 100, 202; 709/221, 223; 714/6; 717/171; 711/1, 114
See application file for complete search history.

(56) References Cited

U.S. PATENT DOCUMENTS

| | | | | |
|---|---|---|---|---|
| 5,155,847 A | * | 10/1992 | Kirouac et al. ............. 709/221 |
| 5,991,771 A | * | 11/1999 | Falls et al. ................... 707/202 |
| 6,266,736 B1 | * | 7/2001 | Atkinson et al. ........... 711/103 |
| 6,499,083 B1 | * | 12/2002 | Hamlin ........................ 711/112 |
| 6,564,232 B1 | * | 5/2003 | Cole et al. ................... 707/203 |
| 6,681,390 B1 | * | 1/2004 | Fiske ........................... 717/173 |
| 6,832,373 B1 | * | 12/2004 | O'Neill ....................... 717/171 |
| 2003/0056142 A1 | * | 3/2003 | Hashemi ........................ 714/6 |
| 2004/0215755 A1 | * | 10/2004 | O'Neill ....................... 709/223 |

* cited by examiner

*Primary Examiner*—Sam Rimell
(74) *Attorney, Agent, or Firm*—Duft Bornsen & Fishman, LLP (57) ABSTRACT

The present invention provides an apparatus and a method for embedding information from a first configuration data set having data structures into an embedded processing system, wherein embedding the information maintains user-defined variables. Embedding information includes comparing a first identifier from the first configuration data set with a second identifier from a second configuration data set having data structures to determine if the first identifier differs from the second identifier. In response to a determination of the first identifier differing from the second identifier, a decision is made to merge the first configuration data set with the second configuration data set to form a merged configuration data set. Afterwards, the merged configuration data set is written to the embedded processing system, wherein the merged configuration data set includes maintained user-defined variables.

18 Claims, 6 Drawing Sheets

METHOD AND APPARATUS FOR EMBEDDING CONFIGURATION DATA

BACKGROUND OF THE INVENTION

1. Field of the Invention

The present invention is generally directed toward a method and an apparatus for embedded systems. More specifically, the present invention is directed to writing configuration data to a memory device of an embedded system.

2. Discussion of Related Art

An embedded system typically comprises a microprocessor and a memory device. Software instructions stored in the memory device direct the processor to perform predetermined functions, such as controlling an input/output device that is communicatively connected to the processor. Systems and associated software are typically considered as being embedded when a user has a limited interaction with the software that directs the processor. Limited interaction to the system makes the system less prone to errors inadvertently introduced by the user. A very common example of an embedded system would be an embedded processing system having software that directs the process to display information on an Liquid Crystal Display (LCD) of a microwave oven.

Embedded systems are used in a myriad of devices; one such device is a Redundant Arrays of Independent Disks (RAID) controller. In the RAID controller, embedded software directs a processor of the RAID controller to access multiple disks such as computer hard drives. The embedded software also has instructions that direct the processor to read and write to anyone of the disks. The user has a limited interaction with the embedded software that directs the processor. However, instances occur when a user may desire to access a small portion of the embedded software in the RAID controller.

Occasionally, a user wishing to access embedded software of an embedded system will typically do so by writing user-defined variables to the embedded software. The user-defined variables usually include information regarding the user's company name, system types, and system names, to name a few examples. The user-defined variables are stored in sections of data called data structures. The data structures typically reside in sets of data called configuration data sets. The configuration data sets also include software instructions that use the data structures to configure the embedded system.

Manufacturers normally upgrade embedded software to add new features and/or improve a performance of an embedded system. Upgrades to the embedded software are performed because upgrading software is much less expensive than changing hardware every time a new feature is developed. Furthermore, creating new features in software is typically easier than creating new features in hardware. New software is programmed into the embedded system by overwriting existing software within a storage device of the embedded system such as a Non-Volatile Random Access Memory (NVRAM).

As new software is programmed into an embedded system, outdated software is overwritten. Information contained in the outdated software is typically destroyed when the outdated software is overwritten with new software. Thus, user-defined variables that once resided in the outdated software are destroyed and have to be rewritten into data structures of the new software. The process of rewriting the user-defined variables is burdensome and characteristically prone to errors when rewriting the user-defined variables is performed manually.

Currently, a difficulty in overwriting outdated software with new software that maintains user-defined variables exists for a manufacturer of an embedded system. Therefore, users of embedded systems are forced to rewrite their user-defined variables whenever a new software package is delivered to the embedded system. A time between rewrites of user-defined variables could be extended if a software developer simply waited until delivering the new software package to include a larger number of new features, thereby extending a time between new software releases. However, bundling new software features into large software packages means waiting to use desired new software features until the new software package is delivered. Waiting for software reduces an efficiency of a user of an embedded system, possibly costing the user reduced revenue.

While extending the time between deliveries of software features extends the time between rewrites of user-defined variables, the previously described inefficiency of the user of the embedded system can be magnified when the user has to manually rewrite the user-defined variables. Eliminating rewrites would improve the efficiency of the user and allow the software developer to deliver new software features as they become available. Therefore, there exists a need for a method and system of delivering new software to an embedded system that does not overwrite existing user-defined variables.

SUMMARY OF THE INVENTION

The present invention solves the above and other problems and advances the state of the useful arts by providing an apparatus and a method for embedding information from a first configuration data set having data structures into an embedded processing system, wherein embedding the information maintains user-defined variables.

In an exemplary preferred embodiment of the invention a develop system and method for embedding information from a first configuration data set having data structures into an embedded processing system, wherein embedding the information maintains user-defined variables. Embedding information includes comparing a first identifier from the first configuration data set with a second identifier from a second configuration data set having data structures to determine if the first identifier differs from the second identifier. In response to a determination of the first identifier differing from the second identifier, a decision is made to merge the first configuration data set with the second configuration data set to form a merged configuration data set. Afterwards, the merged configuration data set is written to a storage device of the embedded processing system, wherein the merged configuration data set includes maintained user-defined variables.

In one aspect of the invention, the merged configuration data set is stored in a non-volatile memory device.

In another aspect of the invention, the first configuration data set is stored in a volatile memory device.

In another aspect of the invention, the second configuration data set is copied to generate a duplicate second configuration data set. The duplicate second configuration data set is stored in a volatile memory device.

In another aspect of the invention, data boundaries are established based on sizes of the individual data structures of the first configuration data set. Data boundaries are also established based on sizes of the individual data structures of the merged configuration data set. The individual data structures of the merged configuration data set are sequentially written according to the data boundaries beginning with a last data structure and ending with a first data structure.

In another aspect of the invention, the embedded processing system is configured to operate as an input/output controller.

In another aspect of the invention, the user-defined variables include information regarding stripes of a Redundant Array of Independent Disks.

Advantages of the invention include an improved efficiency for an embedded system user. Other advantages include a streamlined migration path for new software as new software features become available.

BRIEF DESCRIPTION OF THE PREFERRED EMBODIMENTS

The same reference number represents the same element on all drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

Figure 1:
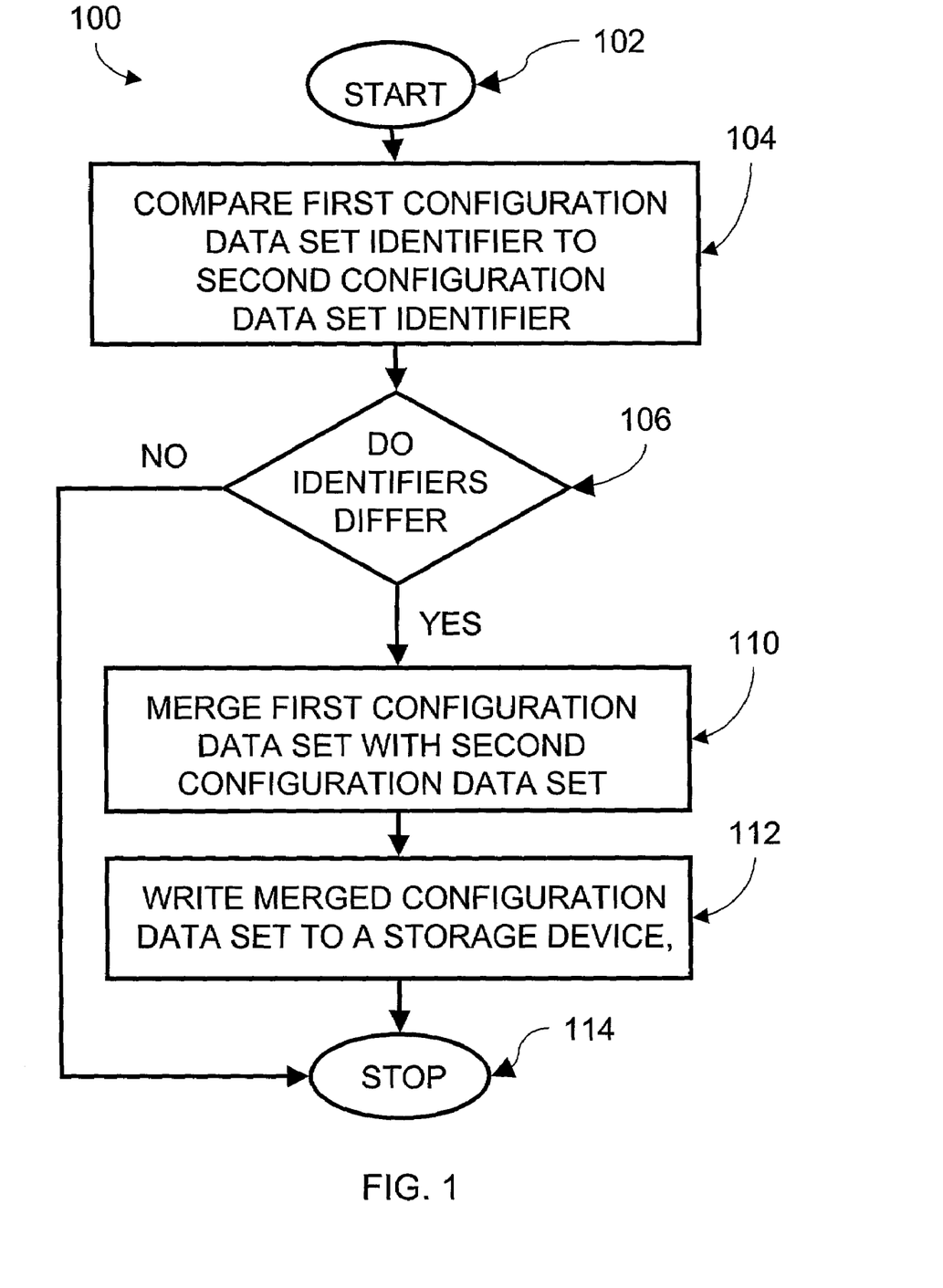
FIG. 1 is a block diagram illustrating an exemplary preferred operation of the invention.

With reference now to the figures and in particular with reference to FIG. 1, exemplary preferred operation 100 of the invention is shown. Operation 100 includes a method of embedding information from a first configuration data set having data structures into an embedded processing system, wherein the method maintains user-defined variables. Operation 100 commences in step 102. A comparison of a first identifier from the first configuration data set with a second identifier from a second configuration data set having data structures is performed in step 104 to determine if the first identifier differs from the second identifier. Decision block 106 directs the flow of operation 100.

In response to a positive determination of the first identifier differing from the second identifier in decision block 106, operation 100 performs the additional steps of merging the first configuration data set with the second configuration data set to form a merged configuration data set in step 110 and writing the merged configuration data set to a storage device in step 112, wherein the merged configuration data set includes maintained user-defined variables. Operation 100 ends in step 114. In response to a negative determination of the first identifier differing from the second identifier in decision block 106, operation 100 ends in step 114.

The storage device can be any device that is configured to store software data and/or instructions. Examples of the storage device include volatile memory devices, such volatile random access memory (RAM), and non-volatile memory devices, such non-volatile random access memory (NVRAM). In a preferred embodiment, the first configuration data set is temporarily stored in a development system that includes a volatile memory. In the same preferred embodiment, the second configuration data set is stored in a non-volatile memory of the embedded processing system and the merged configuration data set is written to the non-volatile memory. An identifier can include a version number, checksum, and/or file size.

Figure 2:
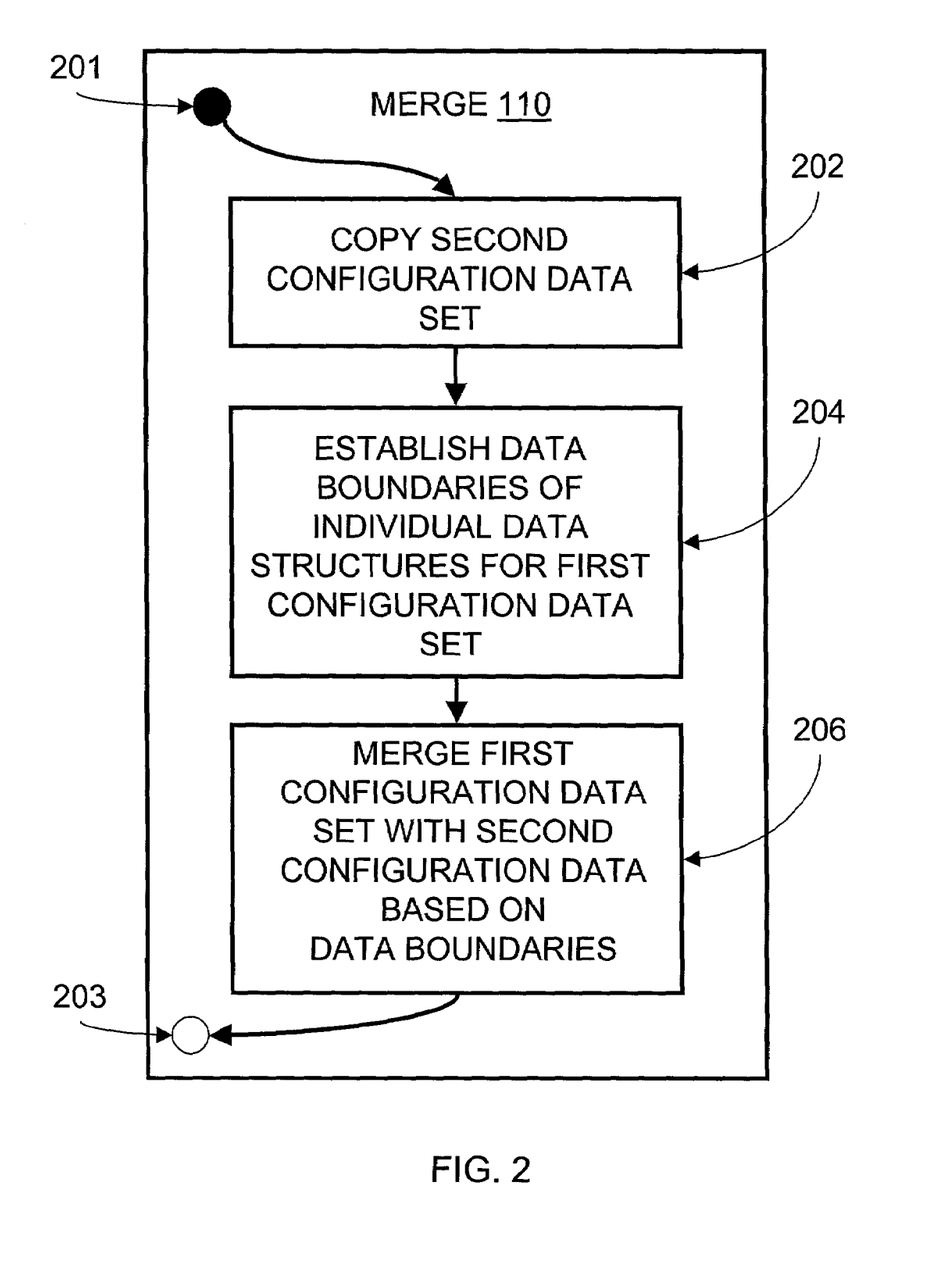
FIG. 2 is a block diagram illustrating an exemplary preferred step of the operation of the invention.

FIG. 2 illustrates an exemplary preferred embodiment of merge step 110 of FIG. 1. Merge step 110 commences operation through entry point 201. Merge step 110 then copies the second configuration data set to generate a duplicate second configuration data set in step 202. Merge step 110 then establishes data boundaries based on sizes of the individual data structures of the first configuration data set. Merge step 110 then merges the first configuration data set with second configuration data set based on the data boundaries of the individual data structures in step 206. Merge step 110 ends through exit point 203.

Step 202 also includes a step of storing the duplicate second configuration data set into a storage device that includes a volatile memory device once the duplicate second configuration data is generated.

Figure 3:
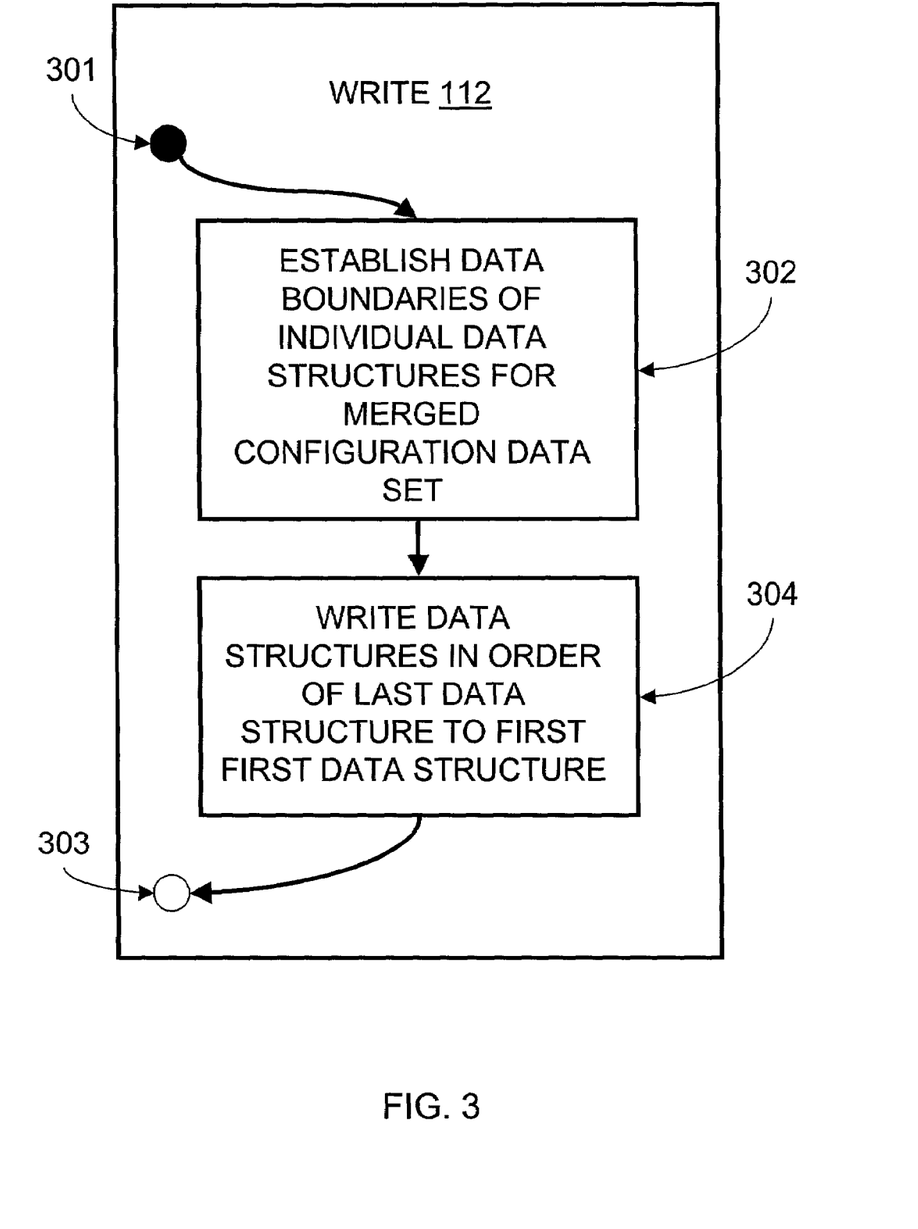
FIG. 3 is a block diagram illustrating another exemplary preferred step of the operation of the invention.

FIG. 3 illustrates an exemplary preferred embodiment of write step 112 of FIG. 1. Write step 112 commences operation through entry point 301. Write step 112 then establishes data boundaries based on sizes of the individual data structures of the merged configuration data set in step 302. Write step 112 then sequentially writes the individual data structures of the merged configuration data set in step 304 according to the data boundaries beginning with a last data structure and ending with a first data structure. Write step 112 ends through exit point 303.

Figure 4:
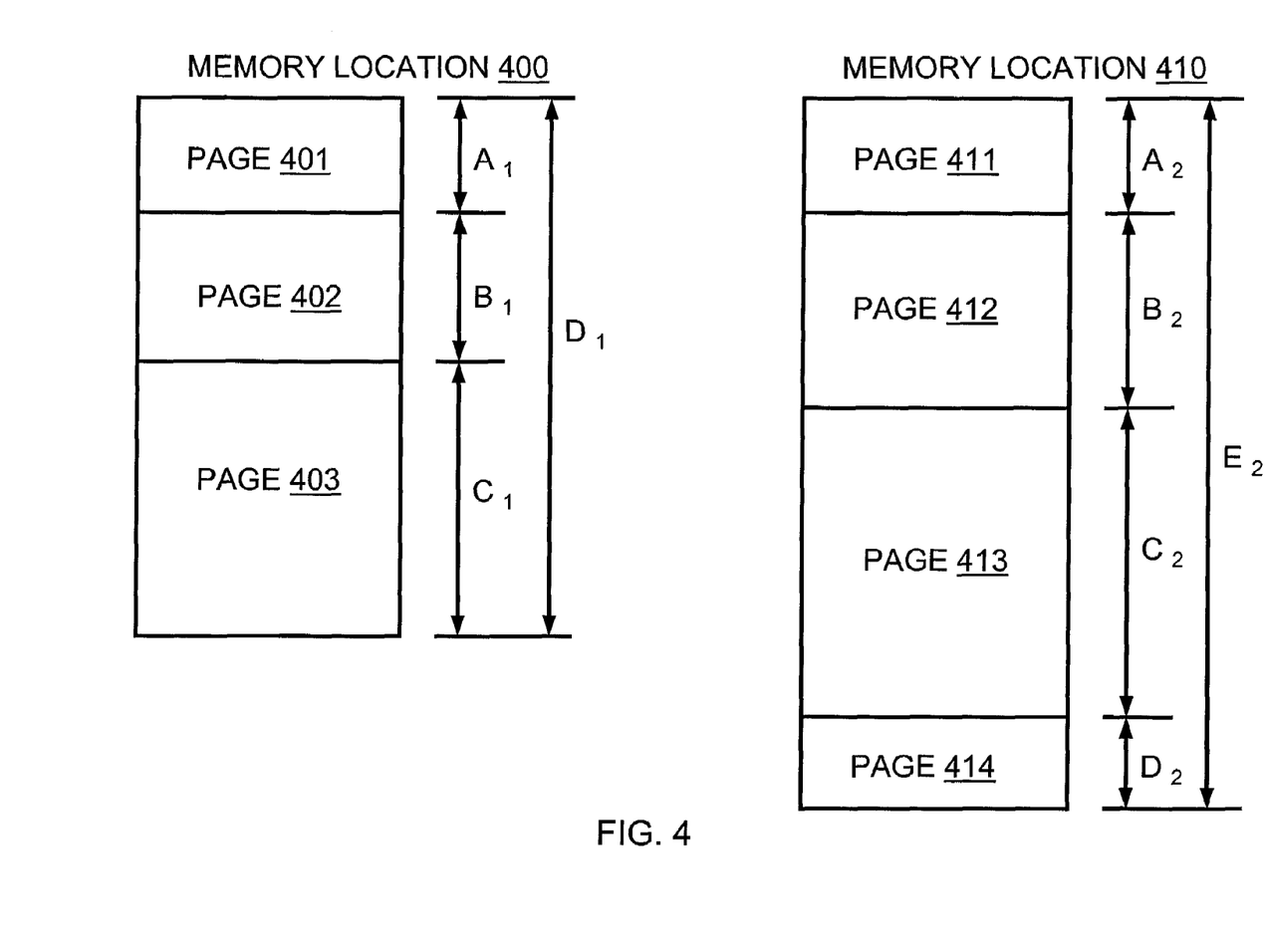
FIG. 4 is a block diagram illustrating exemplary memory locations.

FIG. 4 illustrates a block diagram of exemplary memory location 400 and memory location 410. Memory location 400 represents non-volatile memory of the embedded processing system discussed in FIG. 1. Memory location 410 represents volatile memory of the development system also discussed in FIG. 1. Memory location 400 includes pages 401–403 that represent data structures located within memory space $D_1$ located at memory location 400. Page 401 occupies a memory space of $A_1$ at memory location 400. Page 402 occupies a memory space of $B_1$. Page 403 occupies a memory space of $C_1$. The memory spaces of $A_1$, $B_1$, and $C_1$ have a sum total of memory space of $D_1$ residing at memory location 400.

Memory location 410 includes pages 411–414 that represent data structures located at memory location 410. Page 411 occupies a memory space of $A_2$ at memory location 410. Page 412 occupies a memory space of $B_2$. Page 413 occupies a memory space of $C_2$. Page 414 occupies a memory space of $D_2$ within memory location 410. The memory spaces of $A_2$, $B_2$, $C_2$ and $D_2$ have a sum total of memory space of $E_2$ residing at memory location 410.

Memory location 400 stores a previous version of configuration data for the embedded system. Memory location 410 stores a new version of configuration data that is to be merged with the previous version of configuration data. Each version of the configuration data includes a version number. The version numbers of each version of configuration data are compared. If the version numbers differ, a decision is made to merge the two versions of configuration data. The previous version of configuration data is copied and data boundaries of the memory spaces $A_1$, $B_1$, and $C_1$ are determined; data boundaries $A_2$, $B_2$, $C_2$ and $D_2$ are also determined. The new version of configuration data, already residing at memory location 410, is overwritten with the copied previous version of configuration data based on the data boundaries of both versions of configuration data. For example, page 401 at memory location 400 is copied and overwritten onto page 411 at memory location 410.

In one embodiment, a determination is made to ensure that a memory space size of the previous version of configuration data at memory location 400 is not greater than a memory space size of the new version of configuration data at memory location 410. For example, if memory space $A_1$ of page 401 is greater than memory space $A_2$ of page 411, then memory space $A_1$ is not overwritten onto memory space $A_2$. If memory space $A_1$ of page 401 is smaller than memory space $A_2$ of page 411, then memory space $A_1$ is copied and overwritten onto memory space $A_2$.

Overwriting a page from the previous version of configuration data at memory location 400 onto a page of the new version of configuration data at memory location 410 can clear some or all of the new version of configuration data in the page at memory location 410. If the page from memory location 400 is equal in size to the page from memory location 410, the page from memory location 410 will be overwritten with the page from memory location 400. For example, page 401 has a memory space $A_1$ that is equal to the size of memory space $A_2$ of page 411. When page 401 is overwritten onto page 411, the configuration data residing in memory space $A_2$ of page 411 is overwritten with the configuration data residing in memory space $A_1$. If the page from memory location 400 is smaller than the page from memory location 410, the page from memory location 410 still includes information from the new configuration data. For example, page 402 has a memory space $B_1$ that is smaller than memory space $B_2$ of page 412. When page 402 is overwritten onto page 412, an amount of configuration data residing in memory space $B_2$ of page 412 is not overwritten. The amount of data that is not overwritten is $B_2$ minus $B_1$. Memory space designators, such as memory space $B_2$ of page 412, are shown as variables and are not intended to limit an amount of memory space. Similarly, memory locations, such as memory location 400, can reside at in either volatile or nonvolatile memory devices at a location defined by a user. For example, memory location 400 could be located in a volatile random access memory device while memory location 410 could be located in a non-volatile random access memory device.

Optionally, the smaller of two pages can be chosen for selecting previous versions of configuration data. For example, if a page from memory location 400 has a memory space size that is smaller than a memory space size of a page to be merged at memory location 410, the page at memory location 400 could be selected to keep the previous version of configuration data. Additionally, pages can be either deleted or added. An example of a page being added is shown as page 414 at memory location 410.

In a preferred embodiment, a page from memory location 400 can be larger than a page from memory location 410. Although the page from memory location 400 is larger, the page from memory location 400 may be copied onto the smaller page residing at memory location 410. The larger page from memory location 400 is copied onto the smaller page at memory location 410 such that some data from the larger page at memory location 400 is intentionally lost. For example, a portion of the larger page at memory location 400 is copied onto the smaller page at memory location 410. In other embodiments, the merged page residing at memory location 410 can either grow or shrink in memory space size. In some embodiments, the merged page residing at memory location 410 can remain the same memory space size.

Figure 5:
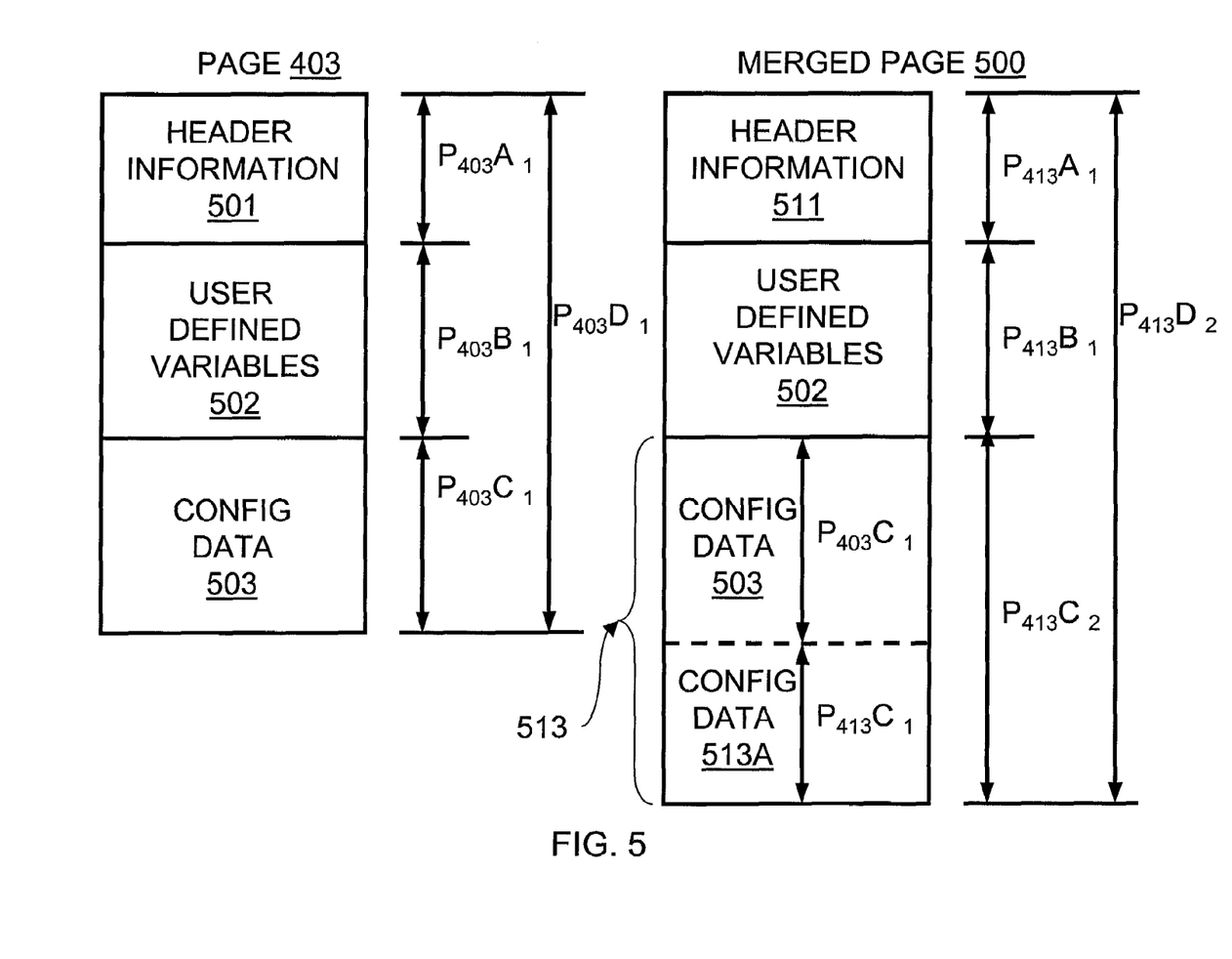
FIG. 5 is a block diagram illustrating exemplary data structures within the memory locations.

FIG. 5 is a block diagram illustrating exemplary data structures. The data structures are shown as page 403 from FIG. 4 and merged page 500. Page 403 includes information that pertains to the previous version of configuration data as described in FIG. 4. Merged page 500 includes information after merging page 403 with page 413 of FIG. 4. Page 403 includes header information block 501 having a memory space $P_{403}A_1$. Page 403 also includes user-defined variable block 502 having a memory space $P_{403}B_1$. Page 403 also includes configuration data block 502 having a memory space $P_{403}C_1$. Memory spaces $P_{403}A_1$, $P_{403}B_1$, and $P_{403}C_1$ have a sum total of memory space $P_{403}D_1$. While user-defined variable block 502 is shown in page 403 and merged page 500 as a separate section within the respective pages, user-defined block 502 can be included in a configuration data block, such configuration data blocks 503 and 513. Sizes of user-defined variable block 502 can vary in size depending on data entered by a user. If user-defined variable block 502 resides within a configuration data block, such as configuration data block 513, user-defined variable block 502 can vary the size of configuration data block 513 as user-defined variable 502 varies in size.

Page 500 includes header information block 511 having a memory space $P_{413}A_1$. Page 500 also includes user-defined variable block 502 having a memory space $P_{413}B_1$. User-defined variable block 502 of page 500 is the same as user-defined variable block 502 of page 403. User-defined variable block 502 is maintained after the merge of page 403 with page 413. Therefore, the size of memory space $P_{413}B_1$ equals the size of memory space $P_{403}B_1$ Page 500 also includes configuration data block 513 having a memory space $P_{413}C_2$. Configuration data block 513 includes two sections of configuration data, configuration data block 503 from page 403, and configuration data block 513A having a memory space of $P_{413}C_1$ from a new version of configuration data. The portion of configuration data block 513 that includes configuration data block 503 is a result of a merge of page 403 with page 413. Memory space $P_{403}C_1$ and $P_{413}C_1$ have a sum total of $P_{413}C_2$. Memory spaces $P_{413}A_1$, $P_{413}B_1$, and $P_{413}C_2$ have a sum total of memory space $P_{413}D_2$.

As stated in FIG. 4, Overwriting a page from the previous version of configuration data, such as page 403, onto a page of the new version of configuration data, such as page 413, clears data from the page. However, since the page from the previous version of configuration data is smaller than the page from the new version of configuration data, the page from the new version of configuration data still includes information from the new configuration data. As page 403 is overwritten onto page 413, respective header information blocks 501 and 511 align pages 403 and 413. Header information blocks 501 and 511 set boundaries that determine where page 403 is overwritten onto page 413. The header information includes details such as the version number of the configuration data and size of the page. When a page is overwritten onto another page, the pages are aligned by a location of the header information.

In the preferred embodiment, header information blocks 501 and 511 typically have respective memory space sizes of $P_{403}A_1$ and $P_{413}A_1$ that are equal. Header information block 501 is not overwritten onto page 413 while user-defined variable block 502 and configuration data block 503 are overwritten onto page 413. Once page 403 is merged onto page 413, merged page 500 includes, header information block 511 from page 413, user-defined variable block 502 from page 403 and configuration data block 503. Any remaining new configuration data from page 413 resides in configuration data block 513A.

After merging and thereby creating merged page 500, merged page 500 is copied and stored at memory location 400 described in FIG. 4. In storing merged page 500, merged page 500 overwrites the existing configuration data set stored at memory location 400 by replacing it with merged page 500. However, user-defined variables are maintained since user-defined variable block 502 remained in tact upon merging and writing. When pages, such as merged page 500 are written to memory location 400, the pages are sequentially written from memory location 410 in reverse order, last page to first page. By sequentially writing the pages in reverse order, the previous version of configuration data residing at location 400 is not likely to be corrupted by potential power outages during the write process. If a page of configuration data from memory location 410 is lost or corrupted from a power outage during the write process, the page that is lost will be the last page of the new version of configuration data, thereby allowing the initial pages of the previous version of configuration data at memory location 400 to remain. However, data residing within merged pages, such as merged page 500, is lost during a power outage since the merged pages typically reside in volatile memory, such as memory location 410. Therefore, a boundary marker is preferably established to determine the last page written to non-volatile memory, such as memory location 400. Those in skilled in the art will understand that other methods of marking data can be used. If the last page written to nonvolatile memory is corrupted by the power outage, the boundary marker determines which pages are to be recopied from non-volatile memory into volatile memory. Once the pages are recopied into volatile memory, the process of writing pages sequentially in reverse order continues until all remaining pages are written into non-volatile memory.

Figure 6:
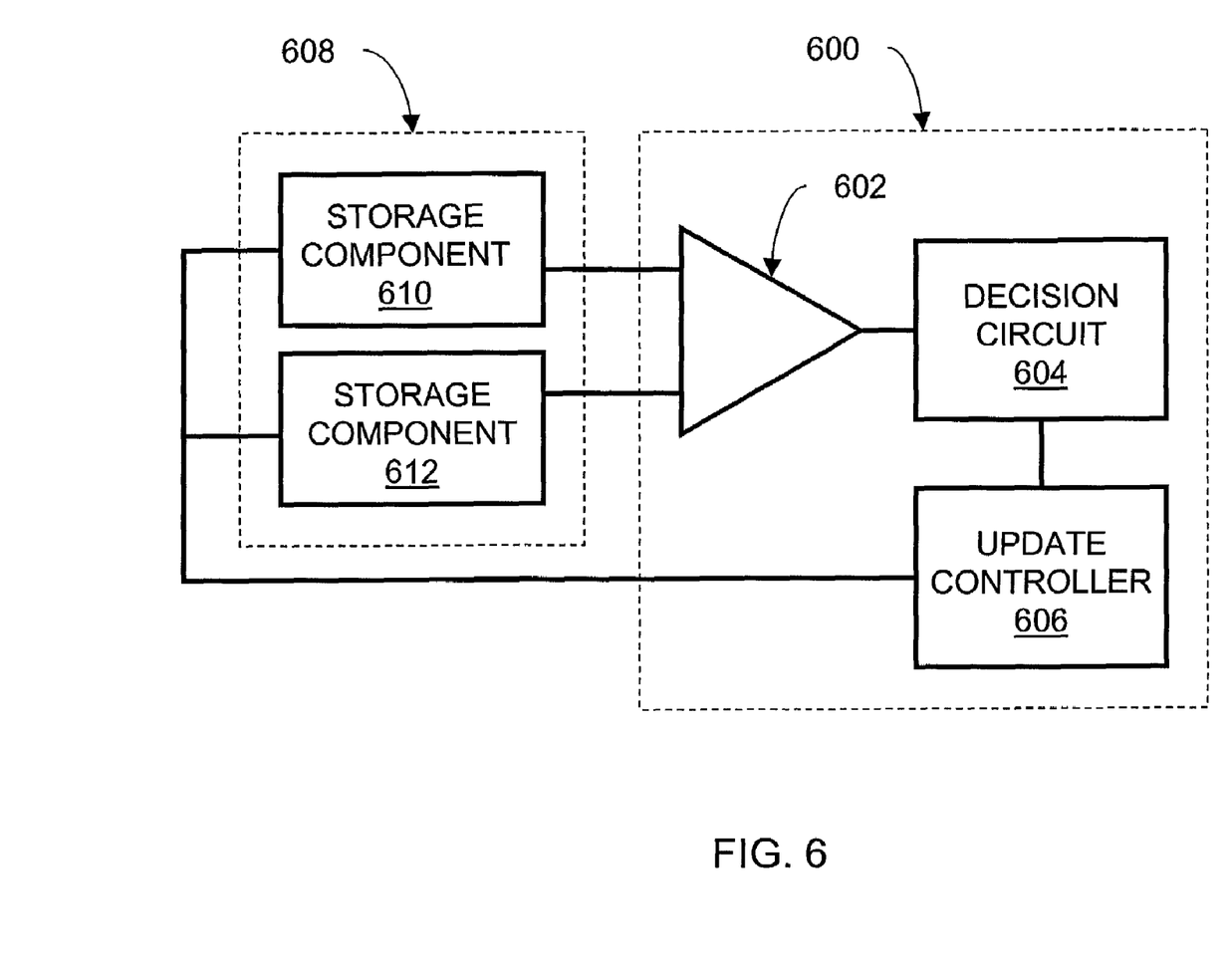
FIG. 6 is a block diagram illustrating a development circuit in an example of the invention.

FIG. 6 illustrates a block diagram of development circuit 600 in an example of the invention. Development circuit 600 includes comparator 602, decision circuit 604, and update controller 606. Comparator 602 has a first input communicatively connected to storage component 610 of storage device 608. Comparator 602 has a second input communicatively connected to storage component 612 of the storage device 608. Decision circuit 604 has an input connected to an output of comparator 602. Update controller 606 has an input connected to an output of decision circuit 604. Update controller 606 is communicatively connected to storage component 610 and to storage component 612. The first storage component can be either a volatile memory device, such as volatile random access memory, or a non-volatile memory device, such as non-volatile random access memory. As well, the second storage component can be either a volatile memory device or non-volatile memory device. The user-defined variables can include information regarding stripes of a Redundant Array of Independent Disks Development circuit 600 is configured for embedding information from a first configuration data set having data structures located in storage component 610 into a second configuration data having date structures located in storage component 612. Comparator 602 compares a first identifier from the first configuration data set with a second identifier from the second configuration data. Decision circuit 604 determines a difference between the first identifier and the second identifier and forwards the difference to update controller 606. Update controller 606, operating in response to the difference, updates the second configuration data set with the first configuration data set. However, user-defined variables are maintained in the updated second configuration data set.

Update controller 606 updates the second configuration data set by establishing data boundaries based on sizes of the individual data structures of the first configuration data set and the second configuration data set. Update controller 606 then merges the first configuration data set with the second configuration data set to form a merged configuration data set. Update controller 606 then sequentially writes the individual data structures of the merged configuration data set according to the data boundaries beginning with a last data structure and ending with a first data structure.

Instructions that perform the above operation can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the above embodiments of the invention include an improved efficiency for an embedded system user. Other advantages include a streamlined migration path for new software as new software features become available.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of embedding information from a first configuration data set having data structures into an embedded processing system, wherein the method maintains user-defined variables, including steps of:
   comparing a first identifier from the first configuration data set with a second identifier from a second configuration data set having data structures to determine if the first identifier differs from the second identifier; and
   in response to a determination of the first identifier differing from the second identifier, performing the steps of
   merging the first configuration data set with the second configuration data set to form a merged configuration data set, and
   writing the merged configuration data set to a storage device associated with the embedded processing system,
   wherein the merged configuration data set includes maintained user-defined variables associated with the first configuration data set and includes portions of the first configuration data set and portions of the second configuration data set, and wherein the user-defined variables include information regarding stripes of a Redundant Array of Independent Disks.

2. The method of claim 1 further including a step of storing the merged configuration data set in the storage device that includes a non-volatile memory device.

3. The method of claim 1 further including a step of storing the first configuration data set in the storage device that includes a volatile memory device.

4. The method of claim 1, wherein the step of merging includes a step of copying the second configuration data set to generate a duplicate second configuration data set.

5. The method of claim 4, wherein the step of copying the second configuration data set includes a step of storing the duplicate second configuration data set into the storage device that includes a volatile memory device.

6. The method of claim 1, wherein the step of merging includes a step of establishing data boundaries based on sizes of the individual data structures of the first configuration data set.

7. The method of claim 1, wherein the step of writing the merged configuration data set includes a step of establishing data boundaries based on sizes of the individual data structures of the merged configuration data set.

8. The method of claim 7, wherein the step of writing the merged configuration data set includes sequentially writing the individual data structures of the merged configuration data set according to the data boundaries beginning with a last data structure and ending with a first data structure.

9. The method of claim 1, wherein the embedded processing system is configured to operate as an input/output controller.

10. A system for embedding information from a first configuration data set having data structures into an embedded processing system, wherein the method maintains user-defined variables, including:
   a means for comparing a first identifier from the first configuration data set with a second identifier from a second configuration data set having data structures to determine if the first identifier differs from the second identifier; and
   in response to a determination of the first identifier differing from the second identifier, operating
   a means for merging the first configuration data set with the second configuration data set to form a merged configuration data set, and
   a means for writing the merged configuration data set to a storage device associated with the embedded processing system,
   wherein the merged configuration data set includes maintained user-defined variables associated with the first configuration data set and includes portions of the first configuration data set and portions of the second configuration data set, and
   wherein the user-defined variables include information regarding stripes of a Redundant Array of Independent Disks.

11. The system of claim 10 further including a means for storing the merged configuration data set in the storage device that includes a non-volatile memory device.

12. The system of claim 10 further including a means for storing the first configuration data set in the storage device that includes a volatile memory device.

13. The system of claim 10, wherein the means for merging includes a means for copying the second configuration data set to generate a duplicate second configuration data set.

14. The system of claim 13, wherein the means for copying the second configuration data set includes a means for storing the duplicate second configuration data set into the storage device that includes a volatile memory device.

15. The system of claim 10, wherein the means for merging includes a means for establishing data boundaries based on sizes of the individual data structures of the first configuration data set.

16. The system of claim 10, wherein the means for writing the merged configuration data set includes a means for establishing data boundaries based on sizes of the individual data structures of the merged configuration data set.

17. The system of claim 16, wherein the means for writing the merged configuration data set includes sequentially writing the individual data structures of the merged configuration data set according to the data boundaries beginning with a last data structure and ending with a first data structure.

18. The system of claim 10, wherein the embedded processing system is configured to operate as an input/output controller.

* * * * *